(12) United States Patent
Hayashi

(10) Patent No.: US 9,547,443 B2
(45) Date of Patent: Jan. 17, 2017

(54) METHOD AND APPARATUS TO PIN PAGE BASED ON SERVER STATE

(75) Inventor: Shinichi Hayashi, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 1002 days.

(21) Appl. No.: 13/460,634

(22) Filed: Apr. 30, 2012

(65) Prior Publication Data

US 2013/0290628 A1 Oct. 31, 2013

(51) Int. Cl.
*G06F 12/02* (2006.01)
*G06F 3/06* (2006.01)

(52) U.S. Cl.
CPC ........... *G06F 3/0611* (2013.01); *G06F 3/0649* (2013.01); *G06F 3/0685* (2013.01)

(58) Field of Classification Search
CPC ..................... G06F 12/08; G06F 2009/4557
See application file for complete search history.

(56) References Cited

U.S. PATENT DOCUMENTS

| | | |
|---|---|---|
| 2007/0055713 A1 | 3/2007 | Nagai et al. |
| 2010/0023565 A1* | 1/2010 | Colbert et al. ................ 707/204 |
| 2011/0202705 A1 | 8/2011 | Hayashi et al. |
| 2013/0132638 A1* | 5/2013 | Horn .................... G06F 12/0871 711/103 |
| 2013/0132674 A1* | 5/2013 | Sundrani ............. G06F 12/0804 711/122 |
| 2013/0238832 A1* | 9/2013 | Dronamraju .......... G06F 3/0608 711/103 |

* cited by examiner

*Primary Examiner* — Charles Rones
*Assistant Examiner* — Ryan Dare

(57) ABSTRACT

A storage system includes plural types of storage devices that define a plurality of virtual volumes and a plurality of logical volumes. A storage controller is configured to manage the plurality of virtual volumes and the plurality of logical volumes, the plurality of virtual volumes defining first storage areas and the plurality of logical volumes defining second storage areas. A second storage area of the plurality of logical volumes is allocated to a first storage area of the plurality of virtual volumes. The storage controller is configured to determine whether data of a first storage area of a swap file is to be stored in the first tier storage device or the second tier storage device based on access information from an application server that manages a swap file information of the swap file.

14 Claims, 22 Drawing Sheets

FILE LOCATION INFORMATION

| FILE NAME | FILE ADDRESS | VOLUME NAME | VOLUME ADDRESS |
|---|---|---|---|
| SWAP FILE | 0 - 15 | V-VOLA | 0 - 15 |
| FILE A | 16 - 31 | V-VOLA | 16 - 31 |
| FILE B | 32 - 47 | V-VOLA | 32 - 47 |

| MEMORY INFORMATION | | | | | |
|---|---|---|---|---|---|
| 701 | 702 | 703 | 704 | 705 | 706 |
| MEMORY CAPACITY | MEMORY USAGE | MEMORY THRESHOLD | SWAP FILE NAME | NUMBER OF SWAP ACCESSES | SWAP THRESHOLD |
| 1000 | 700 | 800 | SWAP FILE | 0 | 100 |

405

RAID GROUP INFORMATION

| RAID GROUP NAME (801) | MEDIA NAME (802) | RAID LEVEL (803) | MEDIA TYPE (804) | CAPACITY (805) |
|---|---|---|---|---|
| RG A | SSD A, SSD B, SSD C | RAID 5 | SSD SLC | 30 (806) |
| RG B | HDD A, HDD B, HDD C | RAID 5 | HDD SAS 15,000 rpm | 100 (807) |
| RG C | HDD D, HDD E, HDD F | RAID 5 | HDD SATA 7,200 rpm | 300 (808) |

Fig. 8

LOGICAL VOLUME INFORMATION — 503

| LOGICAL VOLUME NAME (901) | LOGICAL VOLUME ADDRESS (902) | RAID GROUP NAME (903) | RAID GROUP ADDRESS (904) |
|---|---|---|---|
| L-VOL A | 0 - 29 | RG A | 0 - 29 |
| L-VOL B | 0 - 99 | RG B | 0 - 99 |
| L-VOL C | 0 - 299 | RG C | 0 - 299 |

(rows: 905, 906, 907)

Fig. 9

POOL INFORMATION

| POOL NAME (1001) | LOGICAL VOLUME NAME (1002) | VIRTUAL VOLUME NAME (1003) | CAPACITY (1004) |
|---|---|---|---|
| POOL A | L-VOL A, L-VOL B, L-VOL C | V-VOL A | 430 |
| POOL B | L-VOL D, L-VOL E | V-VOL B | 300 |

Fig. 10

VIRTUAL VOLUME INFORMATION

| VIRTUAL VOLUME PAGE NUMBER | VIRTUAL VOLUME NAME | VIRTUAL VOLUME ADDRESS | LOGICAL VOLUME PAGE NUMBER | LOGICAL VOLUME NAME | LOGICAL VOLUME ADDRESS | NUMBER OF ACCESSES | PINNED |
|---|---|---|---|---|---|---|---|
| PAGE 0 | V-VOL A | 0 - 9 | PAGE 100 | L-VOL A | 0 - 9 | 100 | X |
| PAGE 1 | V-VOL A | 10 - 19 | PAGE 101 | L-VOL A | 10 - 19 | 40 | X |
| PAGE 2 | V-VOL A | 20 - 29 | PAGE 102 | L-VOL A | 20 - 29 | 50 | |
| PAGE 3 | V-VOL A | 30 - 39 | PAGE 200 | L-VOL B | 0 - 9 | 80 | |
| PAGE 4 | V-VOL A | 40 - 49 | PAGE 300 | L-VOL C | 0 - 9 | 3 | |

| TIER | MEDIA TYPE | DEFAULT TIER |
|---|---|---|
| 1 | SSD SLC | |
| 2 | HDD SAS 15,000 rpm | X |
| 3 | HDD SATA 72,00 rpm | |

TIER DEFINITION INFORMATION

| 1401 | 1402 | 1403 | 1404 |
|---|---|---|---|
| COMMAND TYPE | FILE NAME | FILE ADDRESS | DATA |
| WRITE | FILE A | 0 - 3 | ABCD |

FILE WRITE COMMAND 1400

Fig. 14

| | 2101 | 2102 | 2103 | 2104 |
|---|---|---|---|---|
| | COMMAND TYPE | VOLUME NAME | VOLUME ADDRESS | TIER |
| | CHANGE TIERS | V-VOLA | 0 - 3 | TIER 1 |

CHANGE TIERS COMMAND 2100

Fig. 21

METHOD AND APPARATUS TO PIN PAGE BASED ON SERVER STATE

BACKGROUND OF THE INVENTION

The present invention relates to an input/output (I/O) device and data image management systems for servers and storage converged systems. A storage converged system is a system that integrates server, storage, and networking management.

In recent years, thin provisioning has become popular. Thin provisioning includes methods for allocating area for a storage system that receives a write command to an unallocated area and allocating physical devices in response to the write commands, thereby increasing the efficiency of a system. Thin provisioning storage systems may reallocate frequently accessed allocated area to fast and expensive media and reallocate rarely accessed allocated areas to slower and less expensive media.

An example of reallocation is shown in FIG. 1 and FIG. 2, which illustrate thin provisioning systems, where pages define storage areas in virtual volumes and logical volumes. As shown in FIG. 1, virtual volumes V-VOL A includes pages 1 to 4 that are mapped to a plurality of pages in logical volumes in Pool A. In particular, page 2 is mapped to page 200 on tier 2. When the number of accesses to page 2 increases, the storage controller copies data from page 200 on tier 2 to page 101 on tier 1, and copies data from page 101 on tier 1 to page 200 on tier 2. As seen on FIG. 2, the system changes the mappings of the pages, i.e., the link between page 2 and page 200 to a link between page 2 and page 101, and changes the link between page 1 and page 101 to a link between page 1 and page 200. Thus, more frequently accessed data is allocated to higher performance media in order to increase the performance of the system.

In a conventional thin provisioning system, an OS program and an application program are running on a server. The OS program and the application program use virtual memory that is mapped to a memory on the server. If the OS program and the application program use all area of the memory, the OS program moves rarely accessed areas of the memory to a swap file on a storage volume. The OS program allocates area on the memory that is not used to the OS program or the application program and changes links between the virtual memory and the memory, and the virtual memory and the swap file. At this time, performance decreases because I/O latency to memory is substantially shorter than I/O latency to a Hard Disk Drive (HDD) on the storage volume.

When there is free space on the memory, there is no need to access the swap file on the storage volume. Therefore an area that includes the swap file is located on a lower tier. When there is no free space on the memory, there are many accesses to the swap file in order to move data on the memory to the swap file. It takes long time to move the data because the area that includes the swap file is located on lower tier (see FIG. 2). Consequently, performance in such a system is compromised.

As disclosed in U.S. Publication No. 2011/0202705, an administrator can locate a specified object to a specified tier. A storage subsystem gets location information of the specified object and moves pages that include the object based on the location information. Therefore, the administrator can locate the swap file on a higher tier. However, unless there is no free space on the memory on the server, the area of the higher tier that includes the swap file is not used. The cost of media on a higher tier is higher than the cost of media on lower tiers. As a result, cost performance of such a system is low.

BRIEF SUMMARY OF THE INVENTION

The present invention relates generally to thin provisioning and tier management and, more particularly, to a method and an apparatus to move pages between tiers based on server state.

In an embodiment, a storage system includes a plural types of storage devices that define a plurality of virtual volumes and a plurality of logical volumes, the plural types of storage devices including a first tier storage device and a second tier storage device that have different storage characteristics. A storage controller is configured to manage the plurality of virtual volumes and the plurality of logical volumes, the plurality of virtual volumes defining first storage areas and the plurality of logical volumes defining second storage areas. A second storage area of the plurality of logical volumes is allocated to a first storage area of the plurality of virtual volumes. The storage controller is configured to determine whether data of a first storage area of a swap file is to be stored in the first tier storage device or the second tier storage device based on access information from an application server that manages a swap file information of the swap file.

In an embodiment, a method for performing a tier management in a system including an application server and a storage subsystem comprises providing a plural types of storage devices that define a plurality of virtual volumes and a plurality of logical volumes, the plural types of storage devices including a first tier storage device and a second tier storage device that have different storage characteristics. A swap file information of a swap file is monitored, the swap file information being managed by the application server, where a first storage area of the plurality of virtual volumes is associated with the swap file and a second storage area of the plurality of logical volumes is allocated to the first storage area. It is determined whether or not data of the first storage area associated with the swap file is to be stored in the first tier storage device or the second tier storage device according to the swap file information. The data of the first storage area associated with the swap file is moved to the first tier storage device or the second tier storage device according to a result of the determining step.

In an embodiment, a non-transitory computer readable medium includes a computer executable program for performing a tier management in a system. A plural types of storage devices that define a plurality of virtual volumes and a plurality of logical volumes are provided in the system. The plural types of storage devices includes a first tier storage device and a second tier storage device that have different storage characteristics. The non-transitory computer readable medium comprises code for monitoring a swap file information of a swap file, the swap file information being managed by the application server, where a first storage area of the plurality of virtual volumes is associated with the swap file and a second storage area of the plurality of logical volumes is allocated to the first storage area; code for determining whether or not data of the first storage area associated with the swap file is to be stored in the first tier storage device or the second tier storage device according to the swap file information; and code for moving the data of the first storage area associated with the swap file to the first tier storage device or the second tier storage device according to a result of the determining step.

BRIEF DESCRIPTION OF THE DRAWINGS

FIG. 6 shows an embodiment of file location information.

FIG. 7 shows an embodiment of memory information.

FIG. 8 shows an embodiment of RAID group information.

FIG. 9 shows an exemplary embodiment of logical volume information.

FIG. 10 shows an embodiment of pool information.

FIG. 11 shows an embodiment of virtual volume information.

FIG. 12 shows an embodiment of tier identification information.

FIG. 14 shows an embodiment of a file write command.

FIG. 21 shows a flow diagram of an embodiment of a change tiers command.

DETAILED DESCRIPTION OF THE INVENTION

Embodiments of the present invention relate to an input/output (I/O) device and data image management systems for servers and storage converged systems. For example, embodiments of the present invention relate to thin provisioning and tier management and, more particularly, to a method and an apparatus to move pages between tiers based on server state. Server state is monitored. When free space on memory is lower than a threshold value or the number of I/O accesses to a swap file is larger than a threshold value, a page that includes the swap file is moved to a higher tier. In an embodiment, a storage subsystem (also referred to as "storage system") monitors the server state and moves the page that includes the swap file to a higher tier. In another embodiment, a server performs the monitoring and moving steps. In yet another embodiment, a subsystem and a server may cooperate and perform these steps together.

Figure 3:
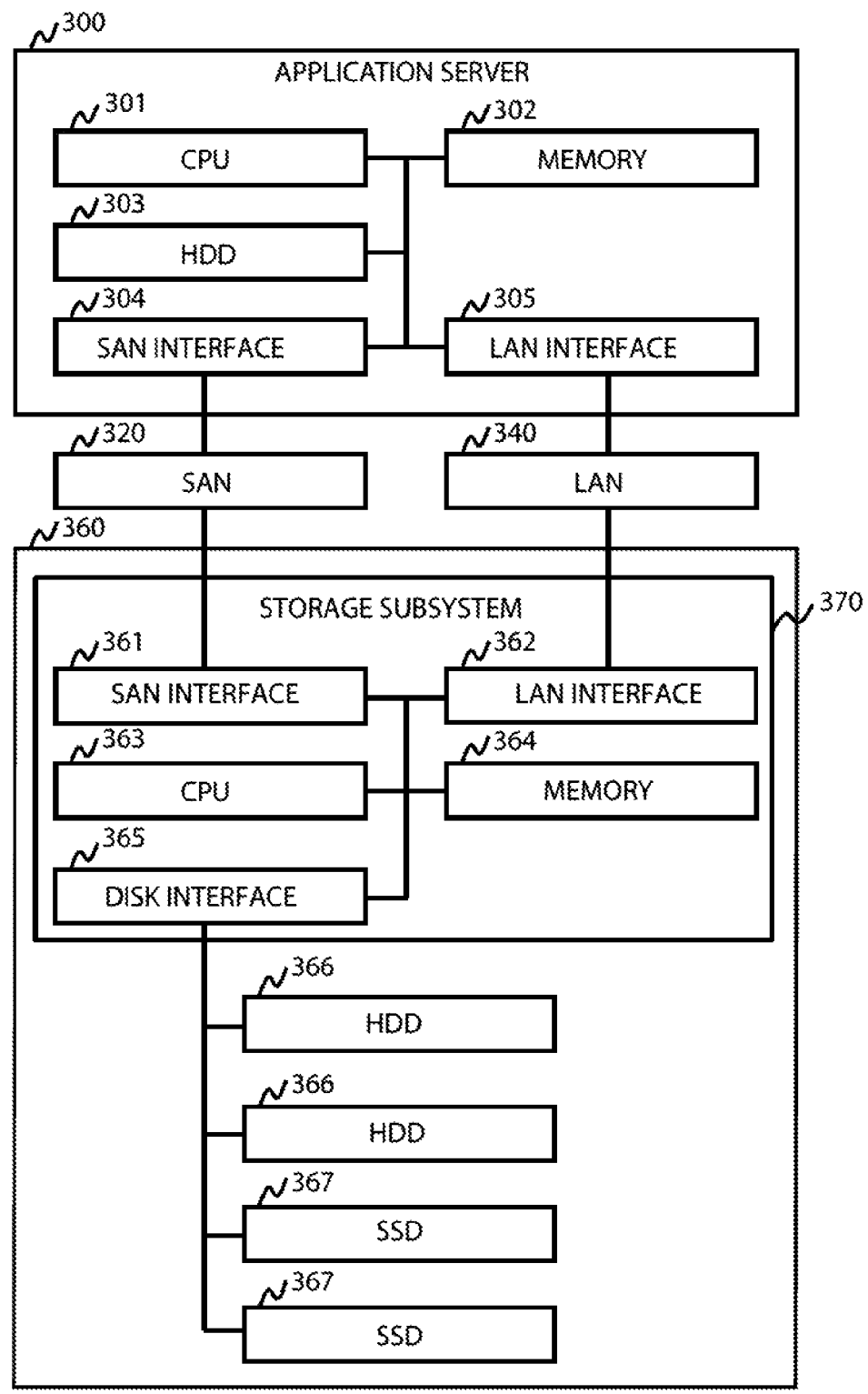
FIG. 3 shows a block diagram of an embodiment of an application server and a storage subsystem.

FIG. 3 illustrates an embodiment of a hardware configuration of an information system in which the method and apparatus of the invention may be applied. An exemplary system comprises an application server 300, a SAN (Storage Area Network) 320, a LAN (Local Area Network) 340, and a storage subsystem 360. The application server 300 comprises a CPU (Central Processing Unit) 301, a memory 302, a HDD (Hard Disk Drive) 303, a SAN interface 304, and a LAN interface 305. SAN interface 304 and LAN interface 305 are used to communicate information between the application server 300 and the storage subsystem 360. Accordingly, these interfaces, alone or together, are referred to as communication interfaces herein.

In an exemplary system, the CPU 301 reads programs from the memory 302, and executes the programs. The memory 302 reads programs and data from the HDD 303 when the application server 300 starts and may store programs and data. The HDD 303 stores programs and data. In an embodiment, the memory 302 is a semiconductor storage device, e.g., Dynamic RAM, that can be accessed fast and provides typically temporarily storage. The memory 302, however, is not limited to DRAM or any particular technology. For example, Resistive RAM, Magnetorestive RAM, or other storage devices may be used as the memory 302 according to implementation.

In an embodiment, SAN interface 304 connects the application server 300 to SAN 320, while the LAN interface 305 couples the application server 300 to the LAN 340. The SAN 320 connects the application server 300 and the storage subsystem 360, and facilitates communication between the application server 300 and the storage subsystem 360. the application server 300 may use SAN 320 to send application data to the storage subsystem 360, and may receive application data from the storage subsystem 360.

Similarly, LAN 340 connects the application server 300 to the storage subsystem 360. The application server 300 uses LAN 340 to send management data to storage subsystem 360 and to receive management data from storage subsystem 360.

In an embodiment, a storage controller 370 of the storage subsystem 360 comprises a SAN interface 361, a LAN interface 362, a CPU 363, a memory 364 (also referred to as "memory device"), and a disk interface 365. The storage controller 370 controls the access to HDDs 366 and SSDs (Solid State Drive) 367 provided in the storage subsystem. The SAN interface 361 connects the storage subsystem 360 and the SAN 320. The LAN interface 362 connects the storage subsystem 360 and the LAN 340. Although FIG. 3 shows two each of HDD 366 and SSD 367, a person skilled in the art will understand that other numbers of HDD 366 and SSD 367 may be used according to implementation. In another embodiment, the storage subsystem 360 may include different tiers of SSD that have different access speeds and characteristics instead of using HDD and SSD.

The CPU 363 reads programs from the memory 364 and executes programs. The memory 364 reads programs and data from the HDD 366 and the SSD 367 when the storage subsystem 360 starts and stores programs and data. The disk interface (also referred to as "storage interface") 365 connects elements of the storage subsystem 360 with storage media such as HDD 366 and SSD 367. Storage media HDD 366 and the SSD 367 may store programs including computer executable code, and data.

Figure 4:
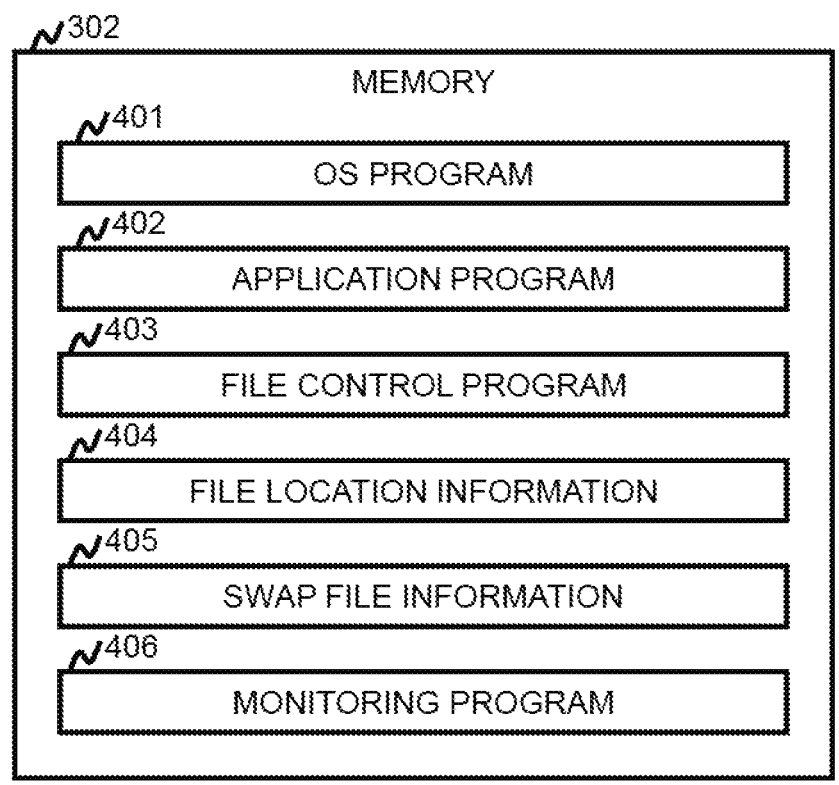
FIG. 4 shows a block diagram of an embodiment of a memory of an application server.

FIG. 4 illustrates an example of the memory 302 included in the application server 300 of FIG. 3. In an embodiment, memory 302 comprises an OS (Operating System) program 401, an application program 402, a file control program 403, file location information 404, memory information 405, and a monitoring program 406. In an embodiment, these information and programs are loaded onto the memory 302 from HDD 303 or another storage device. One of skill in the art will recognize that various embodiments may include more than one of each of the programs or information, and that the programs and information may be distributed across a plurality of memory modules.

The OS program 401 executes the application program 402. The application program 402 (e.g., database program) sends a file read command and a file write command to the file control program 403 to read data from the storage subsystem 360, process data, and write the results to the storage subsystem 360. The file control program 403 manages files, and may be configured to communicate with OS program 401 and application program 402.

The file control program 403 is configured to receive read and write commands from application program 402. When the file control program 403 receives a file read command from the application program 402, the file control program 403 reads data from the storage subsystem 360 and sends the result to application program 402. When the file control program 403 receives a file write command from the application program 402, the file control program 403 writes the data to the storage subsystem 360 and sends the result to the application program 402.

Figure 1:
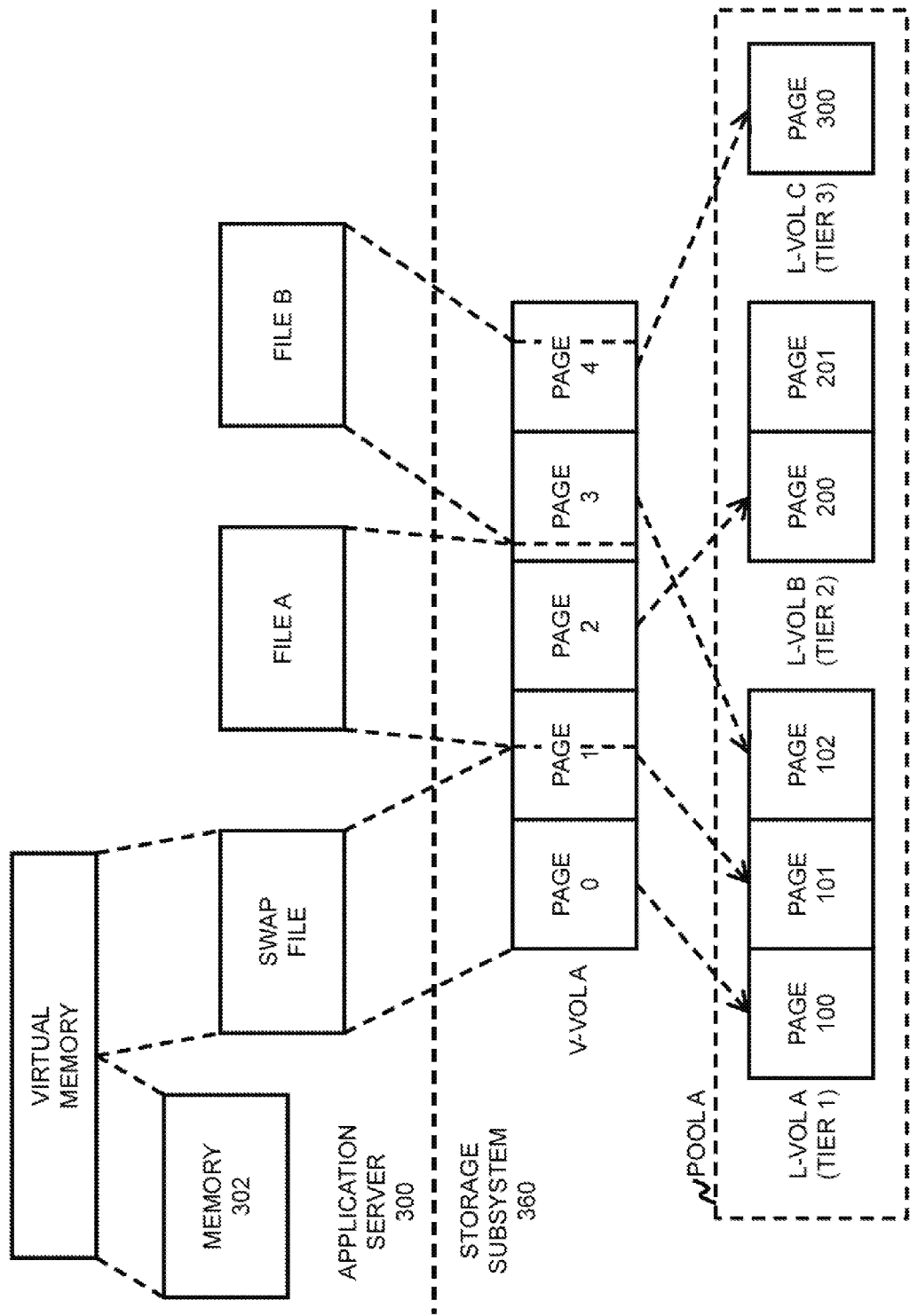
FIG. 1 shows a block diagram of an embodiment of an application server and a storage subsystem.
Figure 2:
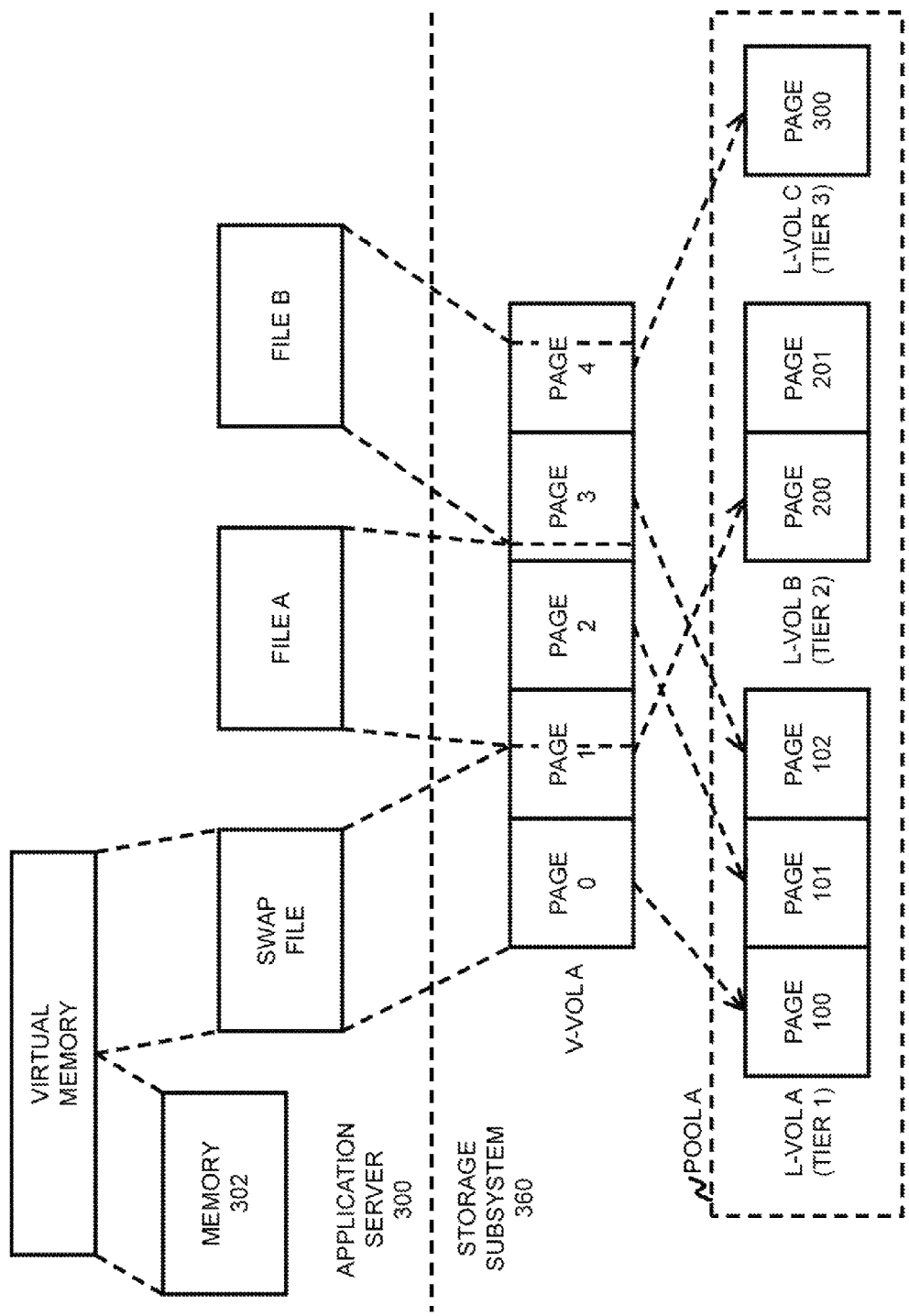
FIG. 2 shows a block diagram of an embodiment of an application server and a storage subsystem.

File location information 404 includes information related to the location of files, which may be files on an application server 300 such as File A and File B as shown on FIG. 1 and FIG. 2. Memory information 405 includes information related to system memory. In an embodiment, monitoring program 406 monitors a server state and transmits a change tiers command 2100 in response to changes in the server state.

Figure 5:
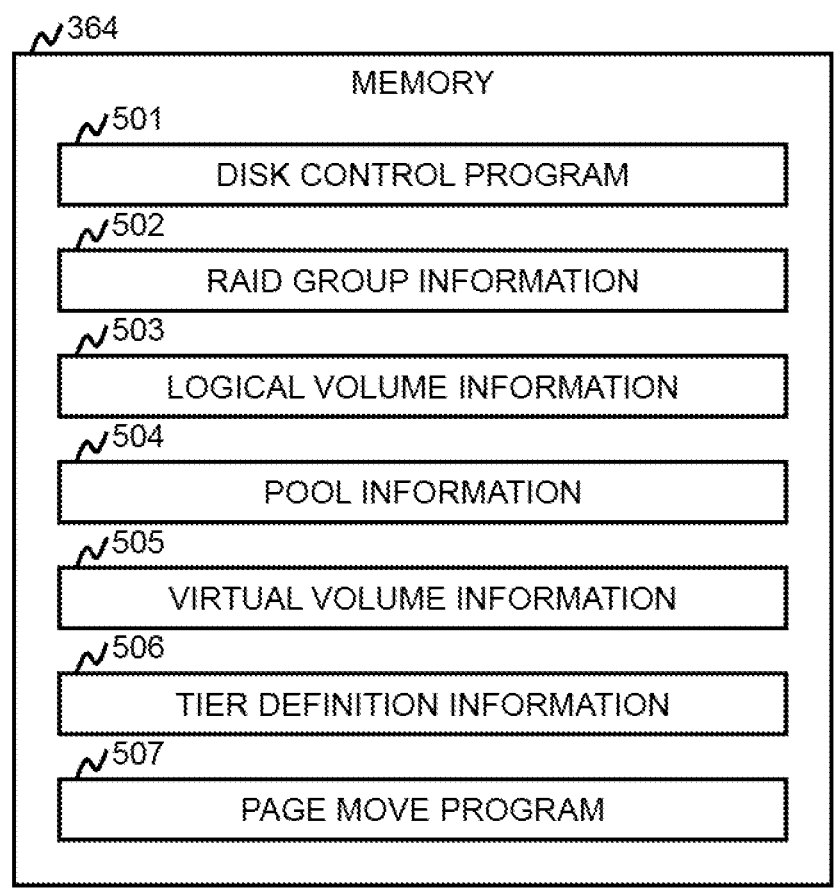
FIG. 5 shows a block diagram of an embodiment of a memory of a storage subsystem.

FIG. 5 illustrates an example of the memory 364 in storage subsystem 360 of FIG. 3. Memory 364 in the storage subsystem 360 comprises a disk control program 501, RAID (Redundant Arrays of Inexpensive (or Independent) Disks) group information 502, logical volume information 503, pool information 504, virtual volume information 505, tier definition information 506, and a page move program 507.

In an embodiment, the disk control program 501 receives read and write commands from the application server 300, reads data from HDD 366 and SSD 367, and writes data to HDD 366 and SSD 367. The disc control program 501 may use the RAID group information 502, the logical volume information 503, the pool information 504, the virtual volume information 505, and the tier definition information 506 in conjunction with read and write operations.

FIG. 6 shows an example of the file location information 404 included in an embodiment of memory 302. The file location information 404 may include a file name 601, a file address 602, a volume name 603, and a volume address 604. Each of these is represented as a column in a table. Rows 605, 606, and 607 correspond to particular files. The location of each file is listed under the file name 601 is defined by its file address 60 and its volume name 603 and volume address 604 of the virtual volume.

FIG. 7 shows an example of the memory information 405 included in an embodiment of memory 302. The memory information 405 is managed by the OS program 401 in the application server 300 in an embodiment. The memory information 405 includes columns corresponding to a memory capacity 701, memory usage 702, a memory threshold 703, a swap file name 704, a number of swap accesses 705, and a swap threshold 706. The memory capacity 701 shows the size of memory 302. The memory usage 702 shows an amount of memory 302 that is used by the OS program 401 and the application program 402 at a given time.

In an embodiment, memory threshold 703 and swap threshold 706 may be determined by a user by entering particular threshold values. In embodiments, the memory threshold 703 may be a relative value such as a percentage, and both threshold values may be determined by a program based on a particular storage system state such as performance and hardware conditions.

The OS program 401 and the application program 402 use the memory 302. If all areas of the memory 302 are used, then the OS program may move data or programs from one or more area that is not frequently used to a swap file that is specified by the swap file name 704. The number of swap accesses 705 shows how many times the swap file is accessed to move an area of the memory 302 to the swap file. The number of swap accesses may be the number of times an area of the memory 302 is moved to the swap file in a given time period. In an embodiment, storage subsystem 360 monitors the memory information 405 including the number of swap accesses 705 and the swap threshold although the memory information 405 is included in the memory 302 of the application server 300. Storage subsystem 360 may use the memory information 405 to remap the swap file to a faster, higher tier device or to a slower, lower tier device, as explained below.

FIG. 8 shows an example of the RAID group information 502. The RAID group information 502 includes columns of a RAID group name 801, a media name 802, a RAID level 803, a media type 804, and a capacity 805. For example, row 806 shows that RAID group RG A comprises storage media SSD A, SSD B, and SSD C, the RAID level of RG A is RAID 5, RG A comprises a single level cell (SLC) SSD, and the capacity of RG A is 30.

Media Type 804 specifies the type of storage media that is used in a particular RAID group. For example, row 806 corresponding to RAID group A indicates that the media is an SSD, row 807 corresponding to RAID group B indicates a 15,000 RPM HDD attached through a serial attached SCSI (SAS) interface, and row 808 corresponding to RAID group C indicates a 7,200 RPM HDD attached through a serial advanced technology attachment (SATA) interface.

In an embodiment, RAID group A corresponds to tier 1 storage, RAID group B corresponds to tier 2 storage, and RAID group C corresponds to tier 3 storage. Capacity 805 may refer to the total capacity of a particular RAID group.

FIG. 9 shows an example of logical volume information 503 in the form of a table. As shown in the columns of the table, the logical volume information 503 includes a logical volume name 901, a logical volume address 902, a RAID group name 903, and a RAID group address 904. For example, row 905 shows that the address from 0 to 19 of logical volume L-VOL A is mapped to the address from 0 to 19 in RAID group RG A, and row 906 shows that the address from 0 to 99 of logical volume L-VOL B is mapped to the address from 0 to 99 in RAID group RG B. In an embodiment, the RAID group address 904 is a physical volume address.

FIG. 10 shows an example of the pool information 504 included in an embodiment of memory 364 in the form of a table. As shown in the columns of the table, the pool information 504 includes a pool name 1001, a logical volume name 1002, a virtual volume name 1003, and a capacity 1004. For example, row 1005 shows that POOL A comprises logical volumes L-VOL A, L-VOL B, and L-VOL C, the area of POOL A is used by virtual volume V-VOL A, and the capacity of V-VOL A is 420.

FIG. 11 shows an example of the virtual volume information 505 included in an embodiment of memory 364 in the form of a table. As shown in the columns of the table, the virtual volume information 505 includes a virtual volume page number 1101, a virtual volume name 1102, a virtual volume address 1103, a logical volume page number 1104, a logical volume name 1105, a logical volume address 1106, a number of accesses 1107, and a pinned status 1108. In this embodiment, the size of each page is 10. In an example, row 1109 shows that virtual volume PAGE 0 is mapped to logical volume PAGE 100, the address of PAGE 0 is from 0 to 9 on V-VOL A, the address of PAGE 100 is from 0 to 9 on L-VOL A, the number of accesses in PAGE 0 is 100, and PAGE 0 is pinned to PAGE 100.

FIG. 12 shows an example of the tier definition information 506 included in an embodiment of memory 364 in the form of a table. As shown in the columns of the table, the tier definition information 506 includes a tier 1201, a media type 1202, and a default tier status 1203. For example, the row 1204 shows that the media type of tier 1 is SSD SLC and that tier 1 is not a default tier, and row 1205 shows that the media type of tier 2 is HDD SAS 15,000 rpm, and that tier 2 is a default tier.

Figure 13:
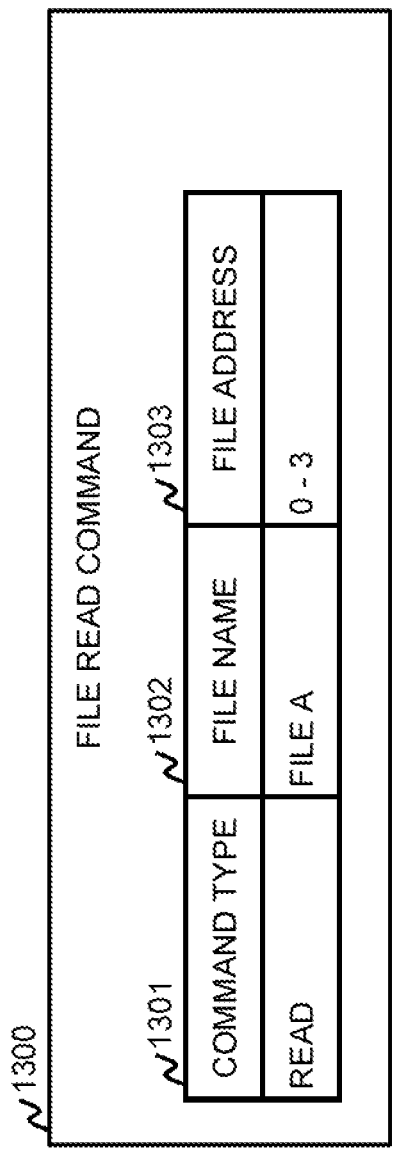
FIG. 13 shows an embodiment of a file read command.

FIG. 13 shows an example of a file read command 1300. The file read command 1300 includes a command type 1301, a file name 1302, and a file address 1303. In an embodiment, file read command 1300 is sent from application program 402 to file control program 403.

FIG. 14 shows an example of a file write command 1400. The write command 1400 includes a command type 1401, a file name 1402, a file address 1403, and data 1404. In an embodiment, file write command 1600 is sent from the application program 402 to the file control program 403.

Figure 15:
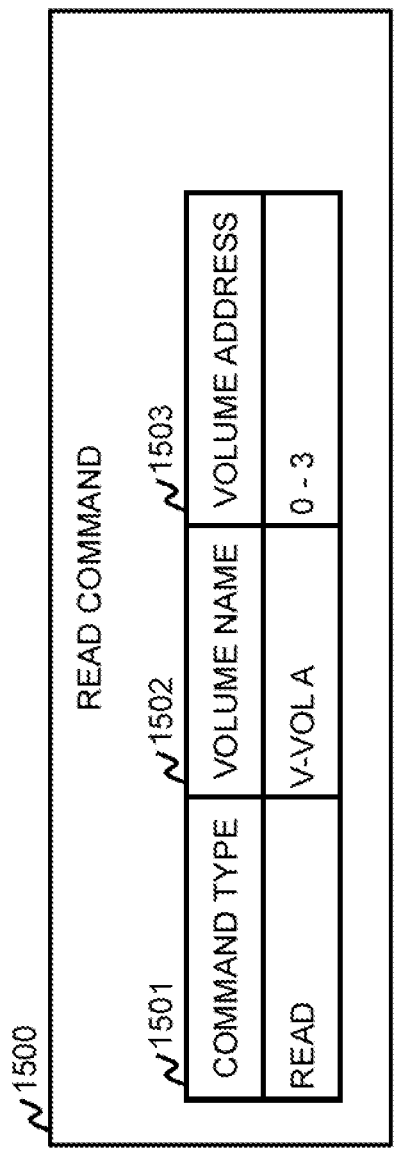
FIG. 15 shows an embodiment of a read command.

FIG. 15 shows an example of a read command 1500. The read command 1500 includes a command type 1501, a volume name 1502, and a volume address 1503. In an embodiment, read command 1500 is sent from the file control program 403 to the storage subsystem 360.

Figure 16:
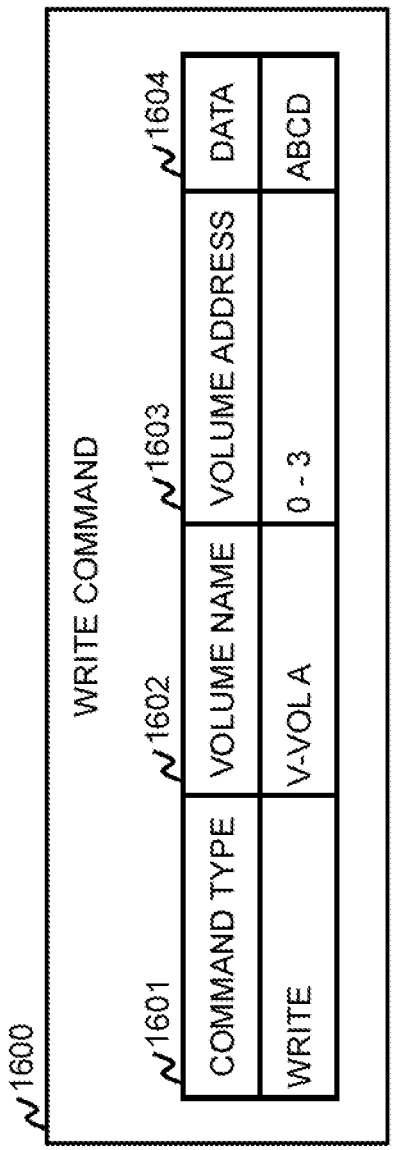
FIG. 16 shows an embodiment of a write command.

FIG. 16 shows an example of a write command 1600. The write command 1600 includes a command type 1601, a volume name 1602, a volume address 1603, and data 1604. In an embodiment, write command 1600 is sent from the file control program 403 to the storage subsystem 360.

Figure 17:
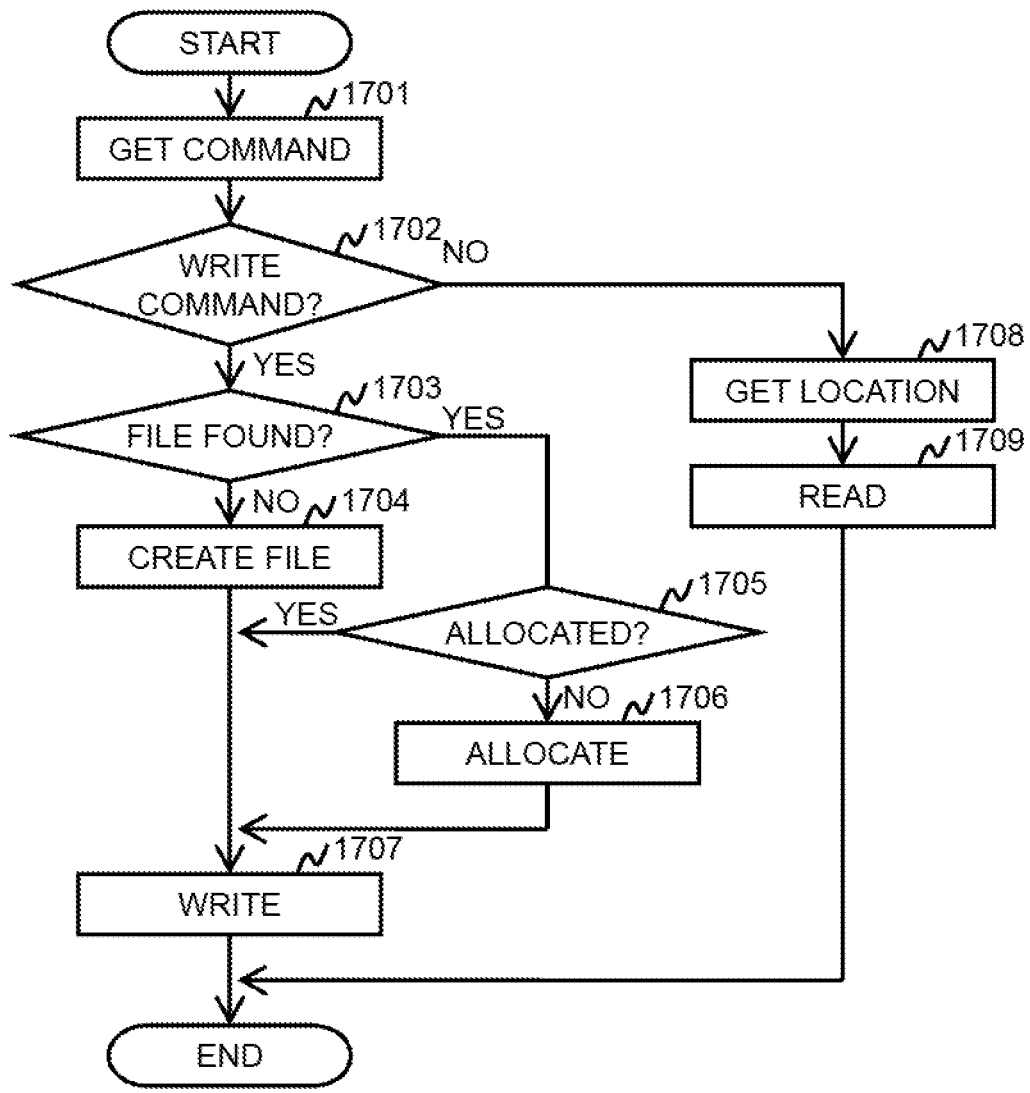
FIG. 17 shows a flow diagram of an embodiment of operations for receiving and executing commands.

FIG. 17 is a flow diagram showing an embodiment of operations for receiving and executing commands. In the embodiment, file control program 403 receives a command, which may be a file read command 1300 or a file write command 1400, from the application program 402, sends a read command 1500 or a write command 1600 to the storage subsystem 360, and sends the result of the read or write operation to the application program 402.

In step 1701, the file control program 403 receives file read command 1300 or file write command 1400 from application program 402. In step 1702, file control program 403 determines whether the command is a read command or a write command. If the command that the file control program 403 received in step 1701 is the file write command 1400, then the process goes to step 1703; if not, then the process goes to step 1708.

In step 1703, the file control program determines whether a file with file name 1402 is present, for example by checking file location information 404. If a file with the file name 1402 in the file write command 1400 is present, then the process goes to operation 1705. If not, then the process goes to operation 1704. The file name may be file name 601 as shown in FIG. 6.

In step 1704, file control program 403 searches the file location information 404 for an area that is not allocated to any files, allocates a new file to the unallocated area, and updates file location information 404. File location information 404 may be updated to include both the file name 601 of the newly created file and the file address 602 corresponding to the newly allocated area.

In step 1705, file control program 403 checks file location information 404 to determine whether the area corresponding to file address 1403 is allocated. If the area specified by the file address 1403 in file write command 1400 is allocated in file address 602, then the process goes to step 1707. If not, then the process goes to step 1706. In step 1706, the file control program 403 searches file location information 404 to determine an area that is not allocated to any files, allocates the unallocated area to the file, and updates file location information 404 accordingly.

In step 1707, the file control program 403 sends a write command 1600 for the volume address 1603 specified by the file write command 1400 and the file location information 404 to the storage subsystem 360 and sends the result of the write to application program 402.

In step 1708, the file control program 403 retrieves the volume name 603 and the volume address 604 for the file name 601 and the file address 602 specified by the file name 1302 and the file address 1303 in the file read command 1300. In step 1709, the file control program 403 sends the read command 1500 where the volume name 1502 and the volume address 1503 correspond to the volume name 603 and the volume address 604 retrieved from step 1708.

Figure 18:
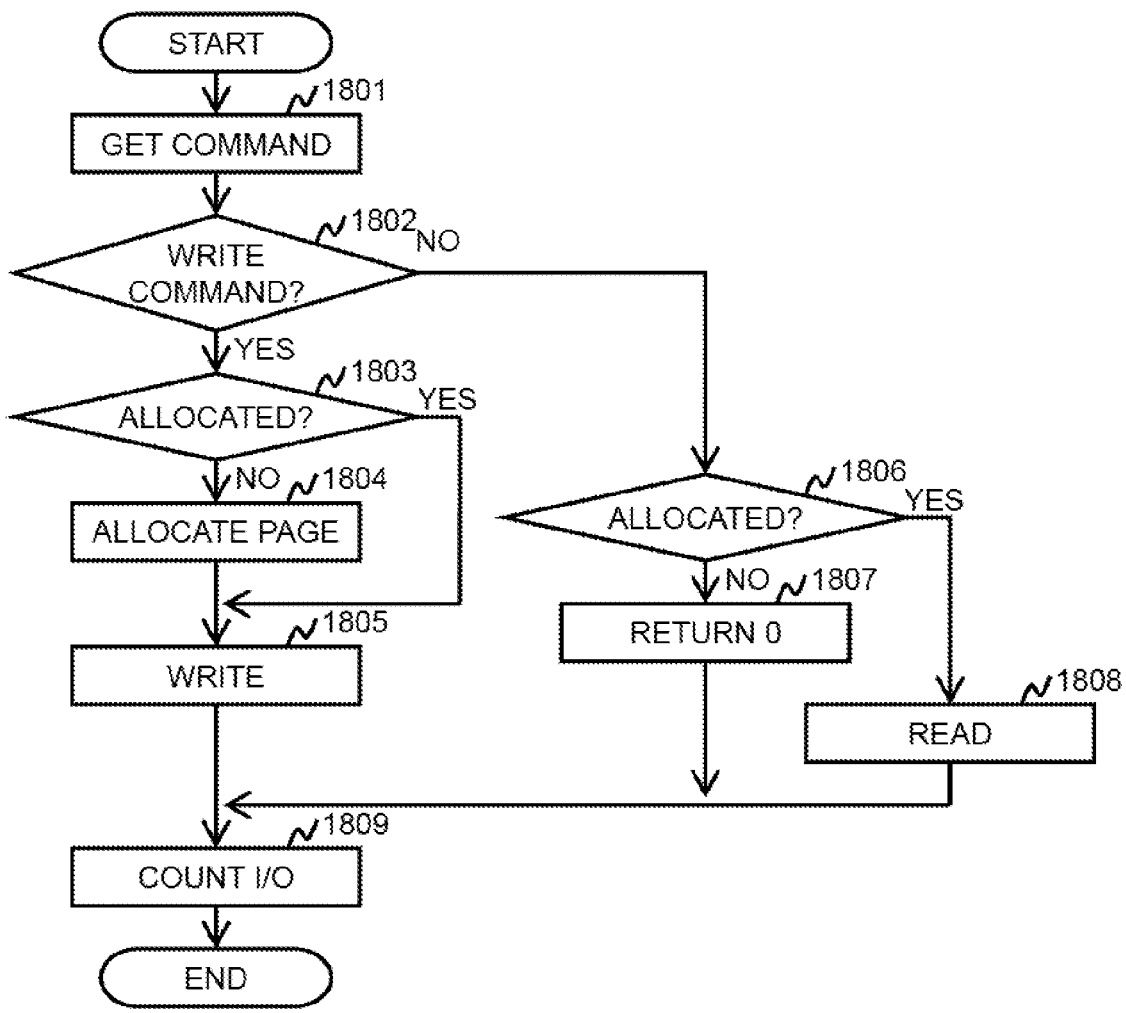
FIG. 18 shows a flow diagram of an embodiment of operations for receiving and executing commands.

FIG. 18 shows an example of a flow diagram showing an embodiment of operations for receiving and executing commands In the embodiment, disk control program 501 receives a read command 1500, a write command 1600, or an allocate command from file control program 403, and disk control program 501 sends the result of the read or write operation.

In step 1801, the disk control program 501 receives a read command 1500 or a write command 1600 from the file control program 403. In step 1802, disk control program 501 determines whether the received command is a write command. If the command that the disk control program 501 received in step 1801 is a write command 1600, then the process goes to operation 1803. If not, then the process goes to step 1806.

In step 1803, disk control program 501 determines whether an area specified by the volume name 1602 and the volume address 1603 of write command 1600 is allocated in the virtual volume information 505. If the area is allocated, then the process goes to step 1805. If not, then the process goes to step 1804. In step 1804, the disk control program 501 allocates an unallocated area of a logical volume of media type 1202 specified by the default tier 1203 in the tier definition information 506 to the virtual volume specified by the volume name 1602 and the volume address 1603. Disk control program 501 then updates the virtual volume information 505 accordingly.

In step 1805, the disk control program 501 gets the volume name 1602 and the volume address 1603 from write command 1600, gets the logical volume name 1105 and the logical volume address 1106 from virtual volume information 505, gets the RAID group name 903 and the RAID group address 904 from logical volume information 503, and writes the data 1604 of the write command 1600 to an area specified by the RAID group name 903 and the RAID group address 904.

In step 1806, disk control program 501 determines whether an area specified by the volume name 1502 and the volume address 1503 of the read command 1500 is allocated in the virtual volume information 505. If the area is allocated, then the process goes to step 1808. If not, then the process goes to step 1807. In step 1807, the disk control program 501 returns a result (e.g., value "0") to the application server 300 indicating the determination that the area specified by the volume name 1502 and the volume address 1503 is not allocated.

In step 1808, the disk control program 501 gets the volume name 1502 and the volume address 1503 from the read command 1500, gets the logical volume name 1105 and the logical volume address 1106 from the virtual volume information 505, gets the RAID group name 903 and the RAID group address 904 from the logical volume information 503, reads an area specified by the RAID group name 903 and the RAID group address 904, and returns the data.

In step 1809, if the command that the disk control program 501 received in step 1801 is a write command 1600, then the disk control program 501 increments the number of accesses 1107 of the row specified by the volume name 1602 and the volume address 1603 in the write command 1600 by 1. If not, then the disk control program 501 increments the number of accesses 1107 of the row including the volume name 1502 and the volume address 1503 in the read command 1500 by 1.

In other words, in operation 1809, disk control program 501 increments the number of accesses 1107 for a virtual volume address every time a read and write command is processed. When a write command 1600 or a read command 1500 is processed, disk control program 501 causes the value in the number of accesses 1107 corresponding to the volume that is read or written to increase by 1. Thus, disk control program 501 monitors the number of I/O operations for a given area, including an area for a swap file.

Figure 19:
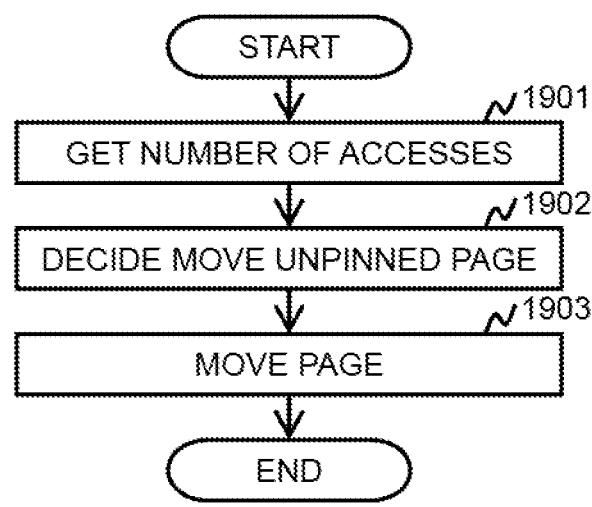
FIG. 19 shows a flow diagram of an embodiment of operations for moving a page.

FIG. 19 shows an example of a flow diagram for operations that are performed when the page move program 507 is executed by the disk control program 501. In an embodiment, the page move program 507 regularly moves frequently accessed pages to a higher tier and rarely accessed pages to a lower tier. In this exemplary embodiment, as shown in tier definition information 506, there are three tiers, where tier 1 is the highest tier and tier 3 is the lowest tier.

In step 1901, the page move program 507 gets the number of accesses 1107 from virtual volume information 505. A benefit of monitoring the access to virtual volumes instead of logical volumes is that it is more direct in terms of monitoring the access from the application server. Thus, monitoring virtual volumes may have lower latency and error rates.

In step 1902, the page move program 507 gets the logical volume name 1002 in the pool information 504, gets the logical volume information 503, gets the RAID group name 801 and the media name 802 from the RAID group information 502, gets the tier definition information 506, calculates the capacity in each tier, and determines pages that should be moved to another tier.

In an embodiment, page move program 507 may consider several factors for a move operation. Program 507 may consider the number of accesses 1107, where pages with higher number of accesses are preferably moved to higher tiers than pages with a lower number of accesses. Program 507 may consider the capacity of the tier, including whether pages currently on a given tier have a higher or lower number of accesses 1107. If pages on a higher tier have a lower number of accesses than a page on a lower tier, page move program 507 may move the page with a higher number of accesses to the higher tier and move the page with the lower accesses to the lower tier. In an embodiment, page move program 507 may not consider moving pages for which the pinned status 1108 is checked.

In an example using the values expressed on the figures, the capacity of tier 1 in POOL A is 30, the capacity of tier 2 in POOL A is 100, and the capacity of tier 3 in POOL A is 300. Therefore, in an embodiment, page move program 507 would determine that PAGE 2 will be moved to tier 2 from tier 1 and PAGE 3 will be moved to tier 1 from tier 2, because the capacity of tier 1 in POOL A is 30, PAGE 0 and PAGE 1 are pinned, the used capacity of tier 1 in POOL A is 30, PAGE 2 is the same size as PAGE 3, and the number of access to PAGE 3 is larger than PAGE 2.

In step 1903, page move program 507 moves pages as determined in step 1902 to the tier specified in step 1902 and updates the virtual volume information 505 accordingly.

Figure 20:
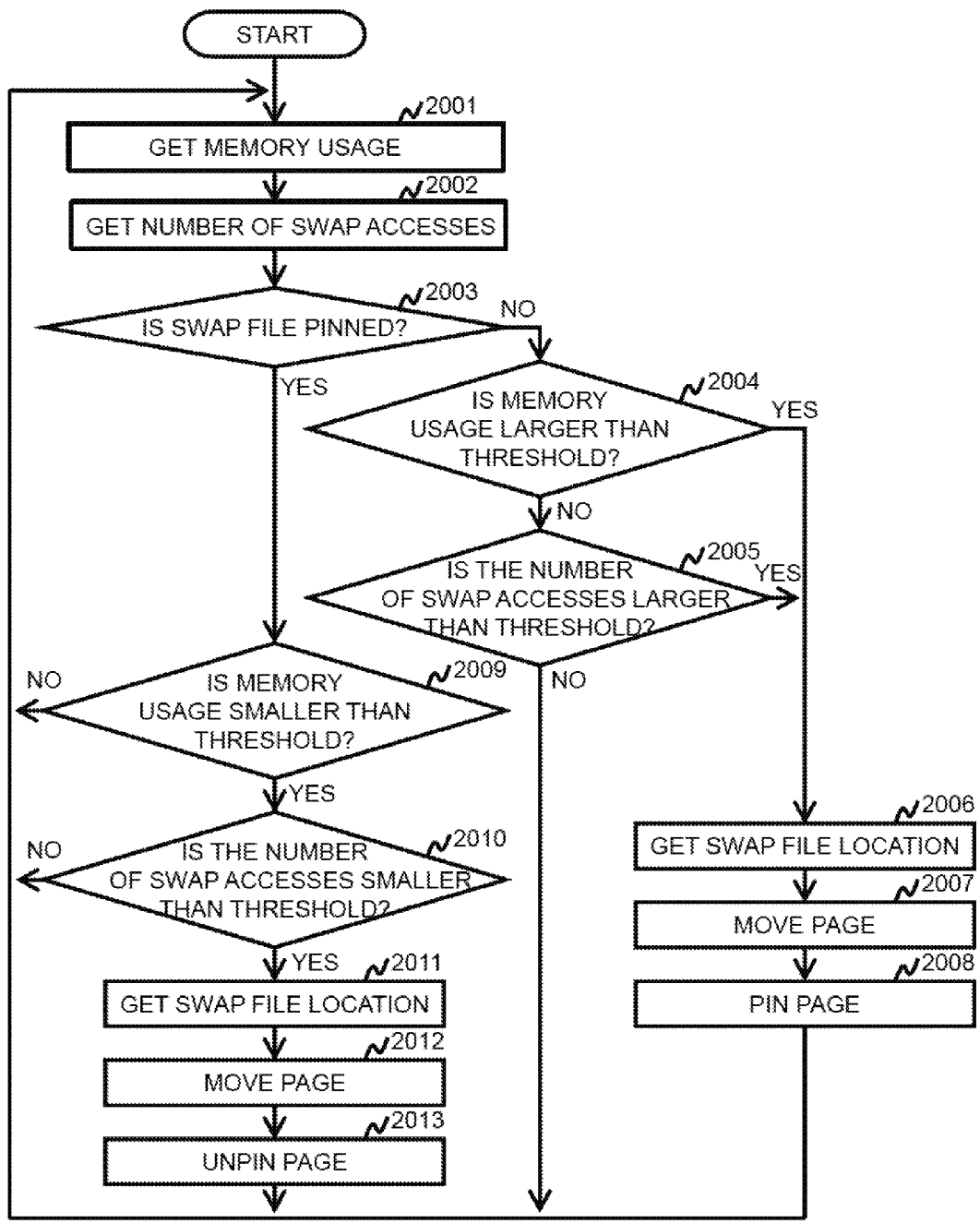
FIG. 20 shows a flow diagram of an embodiment of operations for moving a swap file.

FIG. 20 is an example of a flow diagram for operations that are performed when the page move program 507 running on the storage subsystem 360 moves a page in which a swap file is located when there is insufficient memory (e.g., the memory usage is larger than a memory threshold 706) or the swap file is accessed more than a swap threshold 706.

In step 2001, the page move program 507 retrieves the memory usage 702 and the memory threshold 703 from the application server 300. In step 2002, the page move program 507 retrieves the number of swap accesses 705 and the swap threshold 706 from the application server 300. That is, page move program 507 running in the storage subsystem 360 accesses the swap file information 405 managed by the application server 300 to retrieve the swap file related information.

In step 2003, if there is one or more pinned page for which the pinned status 1108 indicates that the page is pinned, then the process goes to operation 2009. If not, then the process goes to step 2004.

In step 2004, if the memory usage 702 is larger than the memory threshold 703, then the process goes to step 2006. If not, then the process goes to step 2005. In step 2005, if the number of swap access 705 is larger than the swap threshold 706, then the process goes to step 2006; if not, then the process goes to step 2001. In an embodiment, step 2004 may be performed before or after step 2005.

In step 2006, the page move program 507 retrieves the swap file name 704 from memory information 405, and retrieves the volume name 603 and the volume address 604 of the swap file from file location information 404. In step 2007, the page move program 507 moves the page that includes the area that the page move program 507 retrieved in step 2006 to tier 1 and updates the logical page number 1104, the logical volume name 1105, and logical volume address 1106. In step 2008, the page move program 507 changes the pinned status 1108 of the page to "pinned."

In step 2009, if the memory usage 702 is smaller than the memory threshold 703, then the process goes to step 2010. If not, then the process goes to step 2001. In step 2010, if the number of swap accesses 705 is smaller than the swap threshold 706, then the process goes to step 2011. If not, then the process goes to step 2001. In an embodiment, step 2010 may be performed before or after step 2009.

In step 2011, the page move program 507 retrieves the swap file name 704 from memory information 405, and retrieves the volume name 603 and the volume address 604 of the swap file from file location information 404. In step 2012, the page move program 507 moves the page that includes the area that the page move program 507 retrieved in step 2011 to a lower tier and updates the logical page number 1104, the logical volume name 1105, and logical volume address 1106 accordingly. In an embodiment, the lower tier may be the tier where the swap file was originally located prior to being moved to a higher tier in a previously performed operation by the page move program 507. In step 2013, the page move program 507 changes the pinned status 1108 of the page to "unpinned."

Thus, when a swap file is pinned, a process according to steps 2009 through 2013 may move a swap file to a lower tier when the memory usage is lower than a threshold, and/or when a number of I/O operations is lower than a threshold. In an embodiment, the threshold may be adjusted to prevent frequent moving of a swap file when memory usage 702 and number of swap access 705 frequently oscillate above and below their respective threshold values.

FIG. 21 shows an example of a change tiers command 2100. In an embodiment including a change tiers command 2100, application server 300 monitors a server state. When memory usage 702 exceeds memory threshold 703, and/or the number of swap accesses 705 exceeds swap threshold 100, application server 300 sends a change tier command 2100 to storage subsystem 360, and storage subsystem 360 moves a page that includes the swap file to a higher tier.

In an embodiment, the change tiers command 2100 includes a command type 2101, a volume name 2102, a volume address 2103, and a tier 2104, which is a destination tier. The change tiers command 2100 is sent from the monitoring program 406 to the storage subsystem 360.

Figure 22:
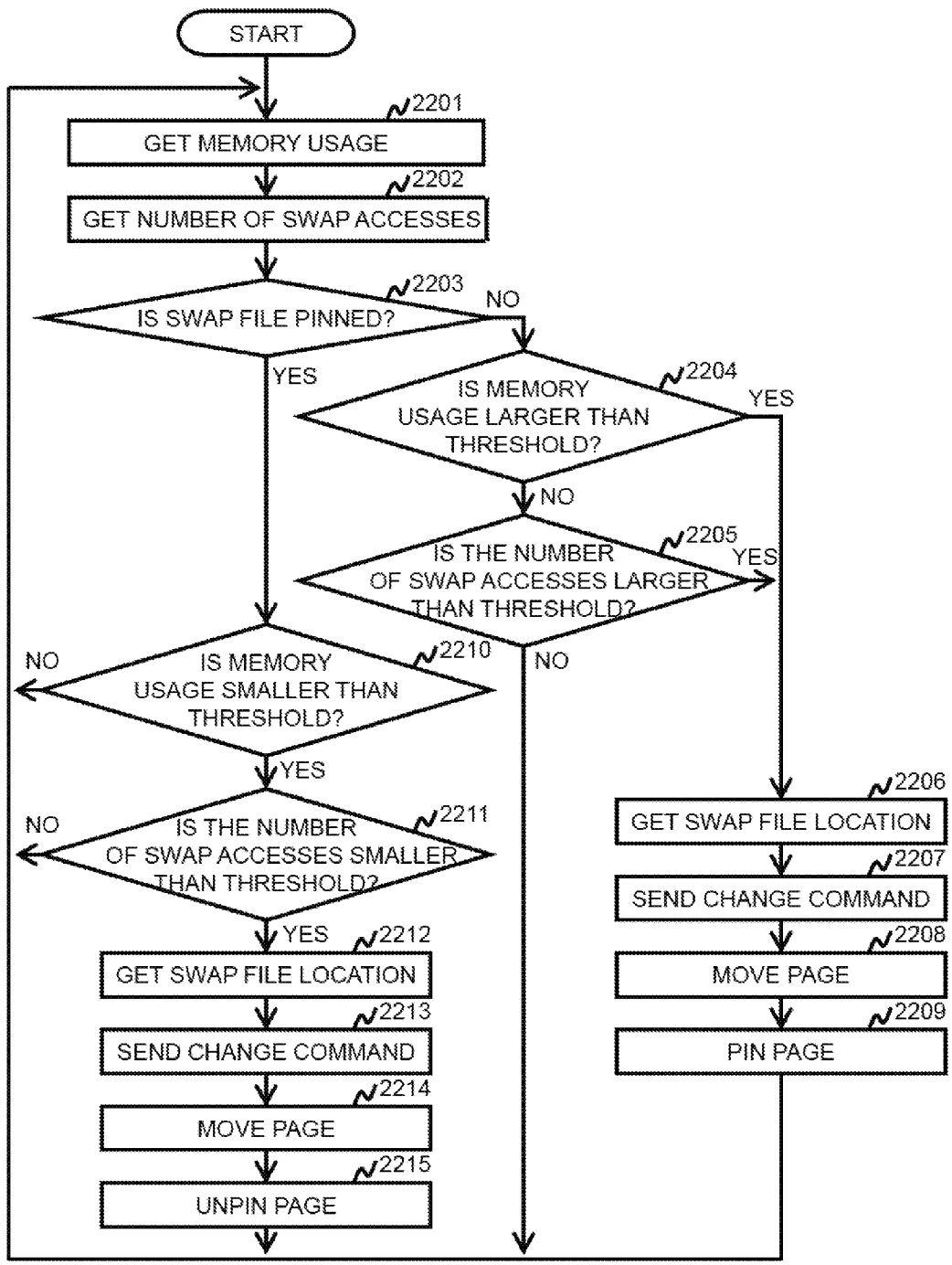
FIG. 22 shows a flow diagram of an embodiment of operations for moving a swap file using a change tiers command.

FIG. 22 is an example of a flow diagram for operations that are performed when the page move program 507 moves a page in which a swap file is located when the memory usage is above a memory threshold 706 or the swap file is accessed more than a swap threshold 706.

In step 2201, the monitoring program 406 running in the application server 300 retrieves the memory usage 702 and the memory threshold 703 by accessing the swap file information 405. In step 2202, the monitoring program 406 retrieves the number of swap accesses 705 and the swap threshold 706 from the application server 300.

In decision step 2203, if there is one or more pinned page that for which the pinned status 1108 indicates that the page is pinned, then the process goes to step 2210; if not, then the process goes to step 2204.

In step 2204, if the memory usage 702 is larger than the memory threshold 703, then the process goes to step 2206; if not, then the process goes to step 2205. In step 2205, if the number of swap access 705 is larger than the swap threshold 706, then the process goes to step 2206; if not, then the process goes to step 2201. In an embodiment, step 2204 may be performed before or after step 2205.

In step 2206, monitoring program 406 gets the swap file name 704 from memory information 405, and gets the volume name 603 and the volume address 604 of the swap file from file location information 404. In step 2207, monitoring program 406 sends a change tiers command 2100, including volume name 2102 and volume address 2103 which correspond to the volume name 603 and the volume address 604 from step 2206. In addition, change tiers command 2100 includes command type 2101, which is a change tiers command, and tier 2104, which is the destination tier. In the embodiment shown in FIG. 21, tier 2104 is TIER 1. Change tiers command 2100 is transmitted to the storage subsystem 360.

In step 2208, the page move program 507 moves the page that includes an area corresponding to volume name 2102 and volume address 2103 identified in the change tiers command 2100 sent in step 2207 to tier 2104, and updates the logical page number 1104, the logical volume name 1105, and logical volume address 1106 accordingly. In step 2209, the page move program 507 changes the pinned status 1108 of the page to "pinned."

In step 2210, if the memory usage 702 is smaller than the memory threshold 703, then the process goes to step 2211; if not, then the process goes to step 2201. In step 2211, if the number of swap accesses 705 is smaller than the swap threshold 706, then the process goes to step 2212; if not, then the process goes to step 2201. In an embodiment, step 2210 may be performed before or after step 2211.

In step 2212, the monitoring program 406 gets the swap file name 704 from memory information 405, and retrieves the volume name 603 and the volume address 604 of the swap file from file location information 404. In step 2213, monitoring program 406 sends a change tiers command 2100 including volume name 2102 and volume address 2103 which correspond to the volume name 603 and the volume address 604 from step 2212.

In addition, change tiers command 2100 includes command type 2101, which is a change tiers command, and tier 2104, which is the destination tier. In an embodiment, tier 2104 for step 2213 is the tier where the swap file was located prior to step 2208, which is a lower tier. Change tiers command 2100 is transmitted to the storage subsystem 360.

In step 2214, the page move program 507 moves the page that includes the area corresponding to volume name 2102 and volume address 2103 identified in the change tiers command of operation 2213 to tier 2104 and updates the logical page number 1104, the logical volume name 1105, and logical volume address 1106 accordingly. In step 2215, the page move program 507 changes the pinned status 1108 of the page to "unpinned."

Embodiments of the invention may include one or more of the following features. In an embodiment, a storage subsystem monitors server state. When free space on memory is lower than threshold or the number of I/O to swap file is larger than threshold, the storage subsystem moves a page that includes the swap file to higher tier. In an embodiment, when free space on memory is lower than threshold or the number of I/O to swap file is larger than threshold, the server may send a change tier command, and the storage subsystem moves a page that includes the area specified by the change tier command to higher tier.

The preceding has been a description of the preferred embodiment of the invention. It will be appreciated that deviations and modifications can be made without departing from the scope of the invention, which is defined by the appended claims.

What is claimed is:

1. A storage system, comprising:
   a plurality of different types of storage devices to provide a plurality of virtual volumes, the plurality of different types of storage devices including (i) a first tier non-volatile storage device to provide a plurality of tier one logical pages and (ii) a second tier non-volatile storage device to provide a plurality of tier two logical pages, the second tier non-volatile storage device having different storage characteristics than the first tier non-volatile storage device; and
   a storage controller configured to manage the plurality of virtual volumes, the plurality of tier one logical pages, and the plurality of tier two logical pages, the plurality of virtual volumes each comprising a plurality of virtual volume pages,
   wherein the storage controller is configured to:
      determine a number of accesses to a virtual volume page, allocate one of a first tier one logical page and a first tier two logical page to the virtual volume page, when the virtual volume page does not include a portion of a swap file, (a) move the virtual volume page to a second tier one logical page when the number of accesses to the virtual volume page is greater than a first threshold value, and (b) move the virtual volume page to a second tier two logical page when the number of accesses to the virtual volume page is less than a second threshold value, and when the virtual volume page includes the portion of the swap file, (a) when a memory usage is above a memory threshold or a number of swap file accesses is greater than a swap file threshold, move the virtual volume page to the second tier one logical page and pin the virtual volume page, and (b) when the memory usage is below the memory threshold and the number of swap file accesses is less than the swap file threshold, move the virtual volume page to the second tier two logical page and unpin the virtual volume page.

2. The storage system of claim 1, wherein the memory usage and the number of swap file accesses is swap file information of the swap file and is managed by an application server.

3. The storage system of claim 2, wherein the storage controller is configured to monitor the swap file information that is managed by the application server in order to retrieve the memory usage and the number of swap file accesses from the application server.

4. The storage system of claim 2, wherein the storage controller is configured to receive the memory usage and the number of swap file accesses from the application server.

5. The storage system of claim 2, wherein the memory usage is a memory usage of a volatile storage.

6. The storage system of claim 2, wherein the application server manages the swap file information on a file basis, and
wherein the first tier non-volatile storage device is a solid state drive and the second tier non-volatile storage device is a hard disk drive.

7. A method for performing a tier management in a storage system including an application server and a storage subsystem, the method comprising:

providing a plurality of different types of storage devices to provide a virtual volume comprising a plurality of virtual pages, the plurality of different types of storage devices including (i) a first tier non-volatile storage device to provide a plurality of tier one logical pages and (ii) a second tier non-volatile storage device to provide a plurality of tier two logical pages, the second tier non-volatile storage device having different storage characteristics than the first tier non-volatile storage device;

monitoring swap file information of a swap file, the swap file information being managed by the application server, wherein a first virtual page is associated with the swap file, the swap file information including a number of accesses of the swap file and a memory usage;

moving data of the first virtual page to a first tier one logical page when the data of the first virtual page is stored on one of the plurality of tier two logical pages and either (a) the memory usage is greater than a memory threshold, (b) the number of accesses of the swap file is greater than a swap file threshold, or (c) both;

moving the data of the first virtual page to a first tier two logical page when the data of the first virtual page is stored on one of the plurality of tier one logical pages, the memory usage is less than the memory threshold, and the number of accesses of the swap file is less than the swap file threshold;

monitoring a number of accesses of a second virtual page, wherein the second virtual page is not associated with the swap file;

moving data of the second virtual page to a second tier one logical page when the data of the second virtual page is stored on one of the plurality of tier two logical pages and the number of accesses of the second virtual page is greater than a first threshold; and moving data of the second virtual page to a second tier two logical page when the data of the second virtual page is stored on one of the plurality of tier one logical pages and the number of accesses of the second virtual page is less than a second threshold.

8. The method of claim 7, further comprising:
retrieving, by a storage controller of the storage system, access information from the application server, the access information being associated with the swap file information of the swap file.

9. The method of claim 8, wherein retrieving the access information by the storage controller includes monitoring, by the storage controller, the swap file information managed by the application server in order to retrieve the access information from the application server.

10. The method of claim 9, wherein the memory usage is memory usage of a volatile storage.

11. A non-transitory computer readable medium including a computer executable program for performing tier management in a storage system, wherein a plurality of different types of storage devices that define a plurality of virtual volumes and a plurality of logical volumes are provided in the storage system, the plurality of different types of storage devices including a first tier non-volatile storage device to provide a plurality of tier one logical pages and a second tier non-volatile storage device to provide a plurality of tier two logical pages, the second tier non-volatile storage device having different storage characteristics than the first tier non-volatile storage device; and wherein the non-transitory computer readable medium comprises code for:

monitoring swap file information of a swap file, the swap file information being managed by an application server, where a first virtual page of the plurality of virtual volumes is associated with the swap file, the swap file information including a number of accesses of the swap file and a memory usage;

moving data of the first virtual page to a first tier one logical page when the data of the first virtual page is stored on one of the plurality of tier two logical pages and either (a) the memory usage is greater than a memory threshold, (b) the number of accesses of the swap file is greater than a swap file threshold, or (c) both;

moving the data of the first virtual page to a first tier two logical page when the data of the first virtual page is stored on one of the plurality of tier one logical pages, the memory usage is less than the memory threshold, and the number of accesses of the swap file is less than the swap file threshold;

monitoring a number of accesses of a second virtual page, wherein the second virtual page is not associated with the swap file;

moving data of the second virtual page to a second tier one logical page when the data of the second virtual page is stored on one of the plurality of tier two logical pages and the number of accesses of the second virtual page is greater than a first threshold; and moving data of the second virtual page to the second tier two logical page when the data of the second virtual page is stored on one of the plurality of tier one logical pages and the number of accesses of the second virtual page is less than a second threshold.

12. The computer readable medium of claim 11, further comprising:
   code for retrieving access information from the application server by a storage controller of the storage system, the access information being associated with the swap file information of the swap file.

13. The computer readable medium of claim 11, further comprising code for causing a storage controller of the storage system to monitor the swap file information managed by the application server in order to retrieve access information from the application server.

14. The computer readable medium of claim 11, further comprising code for receiving access information from the application server, the access information being associated with the swap file information of the swap file.

* * * * *